Patented Feb. 4, 1930

1,745,676

UNITED STATES PATENT OFFICE

ERWIN HOFFA AND ERWIN THOMA, OF HOCHST-ON-THE-MAIN, GERMANY, ASSIGNORS TO GENERAL ANILINE WORKS, INC., OF NEW YORK, N. Y., A CORPORATION OF DELAWARE

AZO DYESTUFFS AND PROCESS OF MAKING THEM

No Drawing. Application filed February 24, 1928, Serial No. 256,805, and in Germany March 2, 1927.

There have been known hitherto only a few blue dyestuffs which can be obtained on the fiber by developing a 2.3-hydroxynaphthoylarylamine with a diazo-compound of an aromatic monamine. Owing to their moderate fastness and undesired shades they could not supplant the coppered dyestuffs from 2.3-hydroxynaphthoylarylamines with tetrazotized dianisidine. For producing useful violet dyeings by way of development of the dyestuff on the fiber, the dyer is compelled to have recourse to mixed dyeings with a dianisidine dyestuff as blue component.

This invention is based on the discovery that blue to violet dyestuffs are obtained by diazotizing 4-amino-diphenylamines of the following formula:

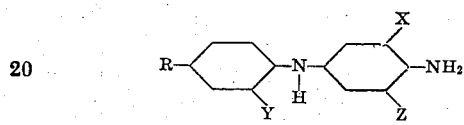

wherein X stands for hydrogen, alkyl or alkoxy; Y stands for hydrogen, alkyl, alkoxy or halogen; Z stands for hydrogen or halogen and R stands for hydrogen, alkyl, alkoxy or halogen, and coupling them with 2.3-hydroxynaphthalenecarboxylic acid-arylamides.

The tints obtained vary within wide limits according to the selection and position of the substituent or substituents in the 4-aminodiphenylamine. Thus, there can be produced for instance blue tints with an extraordinary green hue and also blue tints of a shade like indigo. It is also possible to obtain bluish to reddish violet tints. Furthermore dyeings of good fastness properties can be produced, whereas the known dyestuffs from dianisidine are fast to light only if they have been treated with copper. The disadvantages connected with the treatment with copper are eliminated when the dyestuffs of our present invention are used.

The following examples illustrate our invention:

(1) Boiled and dried cotton yarn is impregnated with a grounding liquor prepared by dissolving 10 grams of 2.3-hydroxynaphthoic acid-β-naphthylamide together with 20 cc. of sodium Turkey red oil of 50 per cent strength in 20 cc. of caustic soda solution of 34° Bé. and 500 cc. of boiling water and making up the whole to one liter. After the material has been well wrung out it is dyed in a diazo-solution prepared as follows: 4.88 grams of 4-amino-3.4'-dimethoxydiphenylamine of the formula:

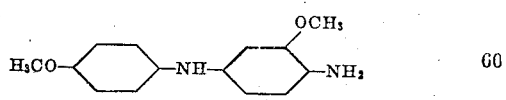

are made into a paste in 50 cc. of hot water and 6 cc. of hydrochloric acid of 20° Bé., cooled with 50 grams of ice and there is then added a solution of 1,5 g. of sodium nitrite in 10 cc. of water. The whole is then made up with cold water to 1 liter, and before use there are added 4 grams of sodium acetate. After the development the yarn is wound off and well washed, then soaped at the boil. Thus a bright greenish blue tint is obtained of good fastness to kier-boiling and to light. The dyestuff itself is a bluish-black powder. It has the formula:

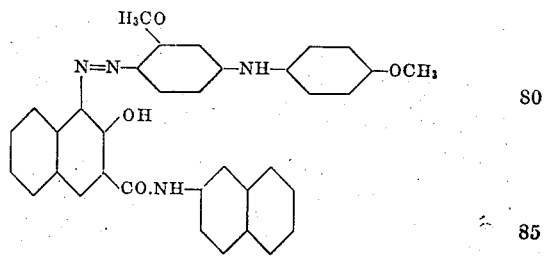

(2) By substituting for the 10 grams of β-naphthylamide and for the 4.88 grams of 4-amino-3.4'-dimethoxydiphenylamine used in the preceding example, 10 grams of α-naphthylamide and 4.56 grams of 4-amino-3-methyl-4'-methoxydiphenylamine of the formula:

respectively a pure blue resembling indigo is obtained which is also of good fastness. The dyestuff itself is a deep dark blue powder and has the formula:

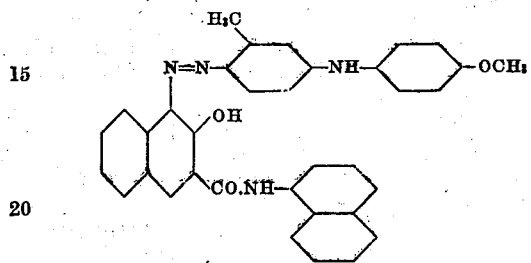

(3) By substituting in Example (1) for the 10 grams of 2.3-hydroxynaphthoic acid-β-naphthylamide 10 grams of 2.3-hydroxynaphthoic acid-4'-chloro-2'-methyl-1'-anilide and for the 4.88 grams of 4-amino-3.4'-dimethoxydiphenylamine 5.27 grams of 4-amino-3-methyl-5-chloro-4'-methoxydiphenylamine of the formula

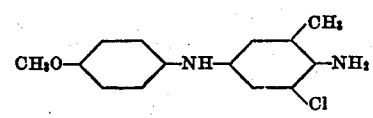

a blue violet of good fastness is obtained. The dyestuff itself forms a deep dark violet powder. It has the formula:

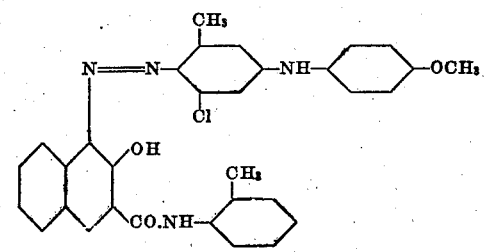

The following table indicates a number of dyestuffs which can be made in accordance with the invention:

| Diazotized | Coupled with 2.3-hydroxy-naphthoyl | Color of the dyeing produced on cotton |
|---|---|---|
| 4-amino-4'-methyldiphenylamine. | 4'-methoxy-1'-anilide. | Dark blue. |
| | 5'-chloro-2'-methoxy-1'-anilide. | Bluish-black. |
| 4-amino-2'-methoxydiphenylamine. | 4'-Cl-2'-methyl-1'-anilide. | Dark blue. |
| | α-naphthylamide. | Very dark blue. |
| 4-amino-4'-methoxydiphenylamine. | Anilide. | Pure deep blue. |
| | 5'-Cl-2'-methoxy-1'-anilide. | Dark indigo blue. |
| 4-amino-3-methyl-4'-methoxydiphenylamine. | 4'-Cl-2'-methyl-1'-anilide. | Dark indigo blue. |
| | β-naphthylamide. | Deep dark blue. |
| 4-amino-3-methyl-4'-methoxydiphenylamine. | 2'-methyl-1'-anilide. | Dark pure blue. |
| | 4'-Cl-2'-methyl-1'-anilide. | Dark pure blue. |
| 4-amino-3.4'-dimethoxydiphenylamine. | β-naphthylamide. | Dark greenish blue. |
| | 2'-methyl-1'-anilide. | Greyish blue. |
| 4-amino-3.2'-dimethyl-4'-methoxydiphenylamine. | α-naphthylamide. | Dark navy blue. |
| | 4'-Cl-2'-methyl-1'-anilide. | Dark navy blue. |
| 4-amino-2'-methyl-3.4'-dimethoxydiphenylamine. | 4'-Cl-2'-methyl-1'-anilide. | Light navy blue. |
| | 5'-Cl-2'-methoxy-1'-anilide. | Light navy blue. |
| 4-amino-3.4'-dimethoxy-2'-chloro-diphenylamine. | α-naphthylamide. | Navy blue. |
| | 4'-methoxy-1'-anilide. | Navy blue. |
| 4-amino-3-ethoxy-4'-methyldiphenylamine. | 4'-chloro-2'-methyl-1'-anilide. | Indigo blue. |
| | Anilide. | Bluish violet. |
| 4-amino-3-methyl-5-chloro-4'-methoxydiphenylamine. | 5'-chloro-2'-methoxy-1'-anilide. | Reddish violet. |
| | 4'-chloro-1'-anilide. | Violet. |
| 4-amino-3-methoxy-6.2'-dimethyl-4'-chlorodiphenylamine. | 2'.5'-dimethoxy-1'-anilide. | Violet. |
| | 4'-chloro-2'-methoxy-1'-anilide. | Violet. |
| 4-amino-5-chloro-3.2'-dimethyl-4'-methoxydiphenylamine. | 2.5'-dimethoxy-1'-anilide. | Dark violet. |
| | 4'-chloro-2'-methoxy-1'-anilide. | Dark violet. |
| 4-amino-3-methyl-5.2'-dichloro-4'-methoxydiphenylamine. | α-naphthylamide. | Dark violet. |
| | 2'-methyl-1'-anilide. | Dark violet. |
| Tribromo-4-aminodiphenylamine. | 4'-Cl-2'-methyl-1'-anilide. | Reddish violet. |
| | α-naphthylamide. | Violet. | and for the 4.88 grams of 4-amino-3.4'-dimethoxydiphenylamine 4.28 grams of 4-amino-4'-methoxydiphenylamine a dark blue of good fastness is obtained. The dyestuff itself is a blue powder and has the formula:

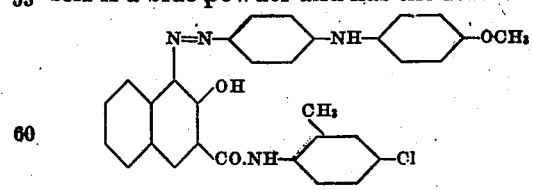

(4) By substituting in Example (1) for the 10 grams of 2.3-hydroxynaphthoic acid-β-naphthylamide 9 grams of 2.3-hydroxynaphthoic acid-2'-methyl-1'-anilide and for the 4.88 grams of 4-amino-3.4'-dimethoxyphenylamine 5.27 grams of 4-amino-3-methyl-5-chloro-4'-methoxydiphenylamine

We claim:
1. The process of preparing azo dyestuffs which consists in diazotizing a 4-aminodiphenylamine of the following formula:

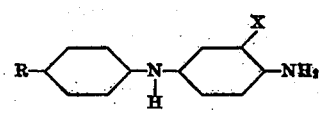

wherein X stands for hydrogen or an alkyl or alkoxy group and R for an alkyl or alkoxy group, and coupling it with a 2.3-hydroxynaphthalenecarboxylic acid-arylamide.

2. The process of preparing azo dyestuffs which consists in diazotizing a 4-aminodiphenylamine of the following formula:

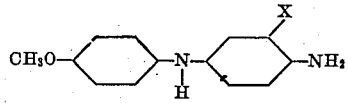

wherein X stands for hydrogen or an alkyl or alkoxy group, and coupling it with a 2.3-hydroxynaphthalenecarboxylic acid-arylamide.

3. The process of preparing azo dyestuffs which consists in diazotizing a 4-aminodiphenylamine of the following formula:

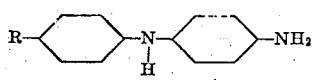

wherein R stands for an alkyl or alkoxy group, and coupling it with a 2.3-hydroxynaphthalenecarboxylic acid-arylamide.

4. The process of preparing azo dyestuffs which consists in diazotizing the 4-aminodiphenylamine of the following formula:

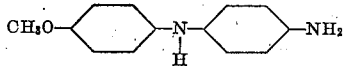

and coupling it with a 2.3-hydroxynaphthalenecarboxylic acid-arylamide.

5. As new products, azo dyestuffs of the following probable formula:

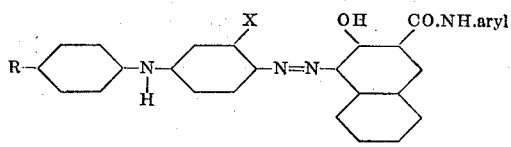

wherein X stands for hydrogen or an alkyl or oxyalkyl group and R for an alkyl or oxyalkyl group, the said products being violet to bluish-black powders and dyeing when produced on the fiber reddish-violet to greenish dark blue tints.

6. As new products, azo dyestuffs of the following probable formula:

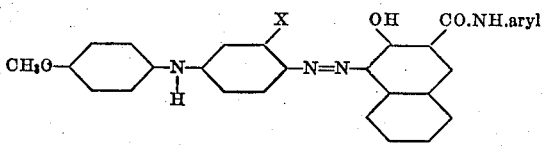

wherein X stands for hydrogen or an alkyl or oxyalkyl group, the said products being violet to bluish-black powders and dyeing when produced on the fiber reddish-violet to greenish dark blue tints.

7. As new products, azo dyestuffs of the following probable formula:

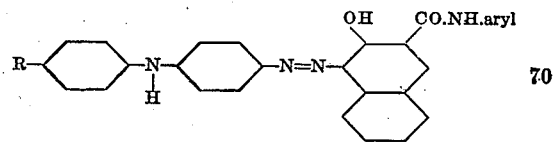

wherein R stands for an alkyl or oxyalkyl group, the said products being violet to bluish-black powders and dyeing when produced on the fiber reddish-violet to greenish dark blue tints.

8. As a new product, the azo dyestuff of the following probable constitution:

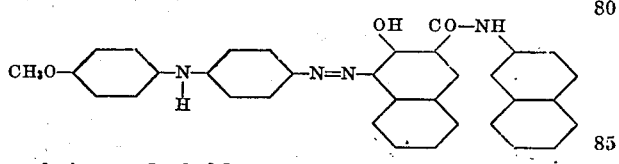

being a dark blue powder and dyeing when produced on the fiber a blue tint of good fastness to kier-boiling and to light.

9. The process of preparing azo dyestuffs of violet to bluish-black tints which consists in diazotizing a 4-aminodiphenylamine of the following formula:

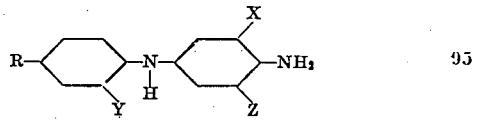

wherein X stands for hydrogen, alkyl or alkoxy, Y for hydrogen, alkyl, alkoxy or halogen, Z for hydrogen or halogen, R for hydrogen, alkyl, alkoxy or halogen and coupling it with a 2.3-hydroxynaphthoic acid-arylamide.

10. The process of preparing azo dyestuffs of violet to bluish-black tints which consists in diazotizing a 4-aminodiphenylamine of the following formula:

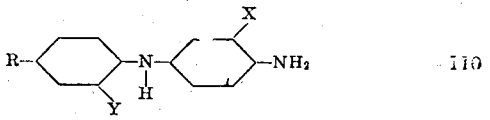

wherein X stands for hydrogen, alkyl or alkoxy, Y for hydrogen, alkyl, alkoxy or halogen, R for hydrogen, alkyl, alkoxy or halogen, and coupling it with a 2.3-hydroxynaphthoic acid-arylamide.

11. The process of preparing azo dyestuffs of violet to bluish-black tints which consists in diazotizing a 4-aminodiphenylamine of the following formula:

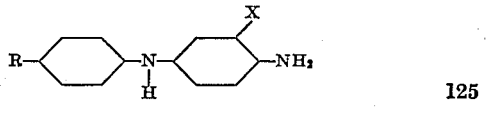

wherein X stands for hydrogen, alkyl or alkoxy and R stands for hydrogen, alkyl, alkoxy or halogen, and coupling it with a 2.3-hydroxynaphthoic acid-arylamide.

12. As new products, azo dyestuffs of the following probable formula:

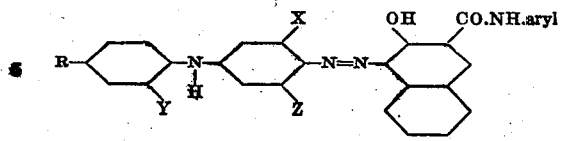

wherein X stands for hydrogen, alkyl or alkoxy, Y stands for hydrogen, alkyl, alkoxy or halogen, Z for hydrogen or halogen, and R for hydrogen, alkyl, alkoxy or halogen, the said products being violet to bluish-black powders and dyeing when produced on the fiber reddish-violet to greenish dark blue tints.

13. As new products, azo dyestuffs of the following probable formula:

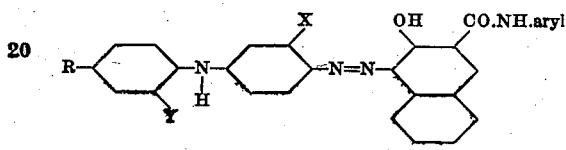

wherein Y stands for hydrogen, alkyl, alkoxy or halogen, X for hydrogen, alkyl or alkoxy, R for hydrogen, alkyl, alkoxy or halogen, the said products being violet to bluish-black powders and dyeing when produced on the fiber reddish-violet to greenish dark blue tints.

14. As new products, azo dyestuffs of the following probable formula:

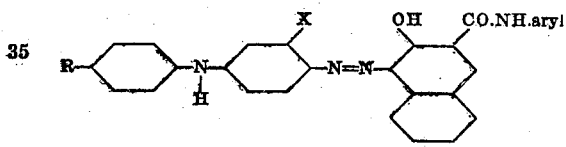

wherein X stands for hydrogen, alkyl or alkoxy and R for hydrogen, alkyl, alkoxy or halogen, the said products being violet to bluish-black powders and dyeing when produced on the fiber reddish-violet to greenish dark blue tints.

In testimony whereof, we affix our signatures.

ERWIN HOFFA.
ERWIN THOMA.

CERTIFICATE OF CORRECTION.

Patent No. 1,745,676.   Granted February 4, 1930, to

ERWIN HOFFA ET AL.

It is hereby certified that error appears in the printed specification of the above numbered patent requiring correction as follows: Page 2, line 36, for "methoxydiphenylamine" read "ethoxydiphenylamine"; and that the said Letters Patent should be read with this correction therein that the same may conform to the record of the case in the Patent Office.

Signed and sealed this 4th day of March, A. D. 1930.

(Seal)

M. J. Moore,
Acting Commissioner of Patents.